(No Model.)
J. J. HOPPES.
BOX OR CASING FOR WATER METERS.
No. 582,354. Patented May 11, 1897.
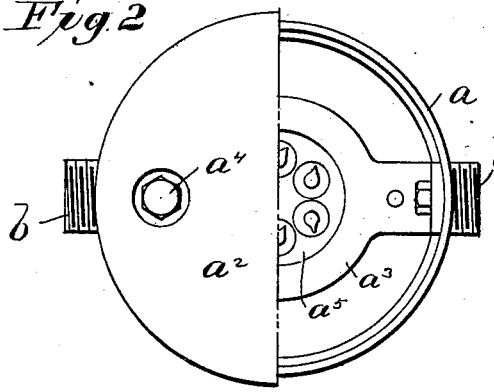
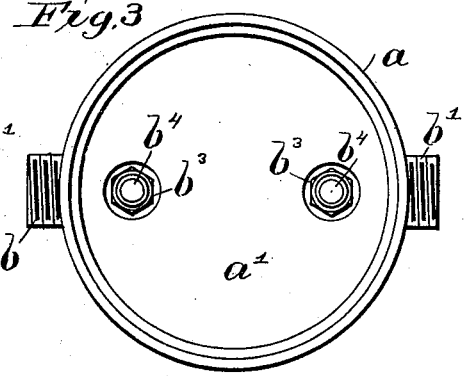
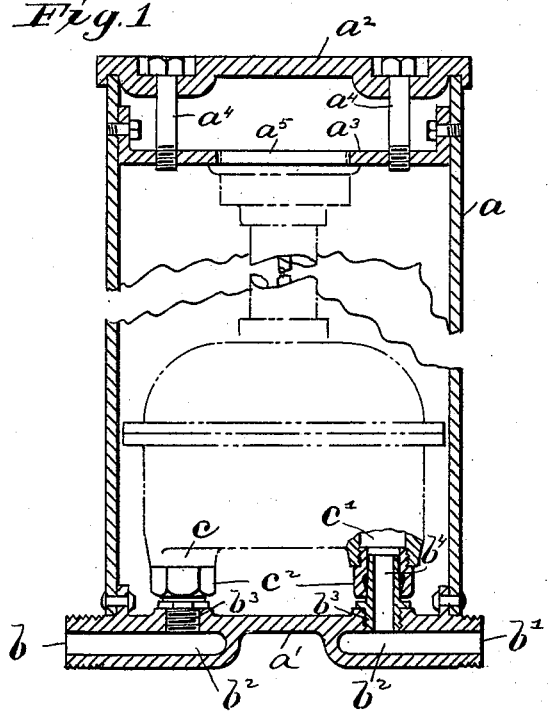
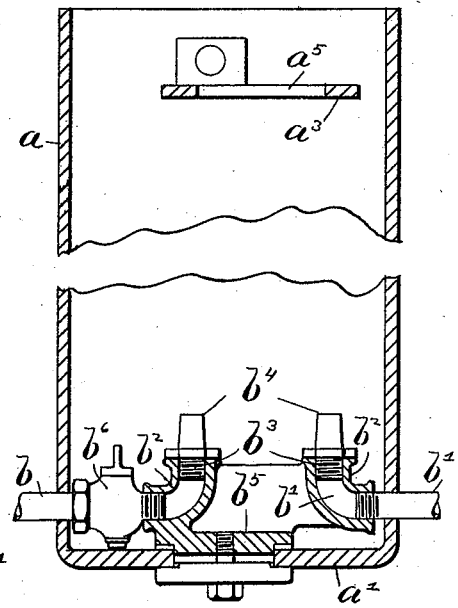
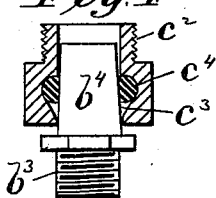
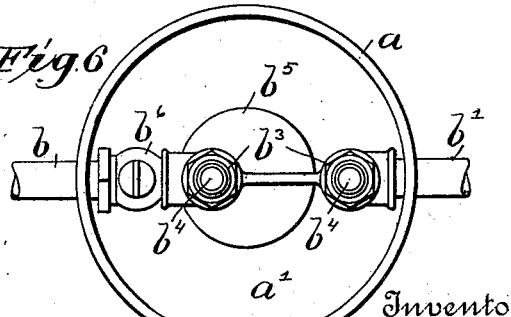
Witnesses
G. M. Gridley
Chas. I. Welch
Inventor
John J. Hoppes
By his Attorney
Paul A. Staley

UNITED STATES PATENT OFFICE.

JOHN J. HOPPES, OF SPRINGFIELD, OHIO.

BOX OR CASING FOR WATER-METERS.

SPECIFICATION forming part of Letters Patent No. 582,354, dated May 11, 1897.

Application filed June 22, 1896. Serial No. 596,432. (No model.)

*To all whom it may concern:*

Be it known that I, JOHN J. HOPPES, a citizen of the United States, residing at Springfield, in the county of Clark and State of Ohio, have invented certain new and useful Improvements in Boxes or Casings for Water-Meters, of which the following is a specification.

My invention relates to a box or casing for water-meters; and the object of my invention is to provide a suitable receptacle for water-meters which is adapted to be placed in any suitable location, so as to inclose the meter in such a manner that the meter-dials are readily accessible for reading, the constructions being such that the outlet and inlet to the meter are formed in the box or casing in such a manner that the meter may be readily removed or replaced for examination, repairs, or otherwise.

For general use in connection with water distribution water-meters, if located in a cellar or basement, are not always accessible for reading or otherwise, and if no such place exists and the meter is placed on the outside of the building or other property to which water is to be supplied it must be buried or an expensive receptacle built to retain the same, and even in such case it is difficult of access, and considerable expense is entailed if it becomes necessary to remove or replace the meter for repairs or otherwise. To overcome these objections and to form a casing or box for meters which may be placed in the ground the same as an ordinary stop-cock box, so that the meter may be readily accessible for reading without entering upon the premises of the users, and, further, to provide such constructions that the meter itself may be readily removed or replaced without the use of tools or the services of an expert, are the objects of my invention. I attain these objects by the constructions shown in the accompanying drawings, in which—

Figure 1 is a vertical sectional view, with some of the parts broken away, of a device embodying my invention. Fig. 2 is a plan view of the same with a part of the upper cover removed. Fig. 3 is a plan view of the box or casing with the meter and its support removed. Fig. 4 is a detail view of one of the slip connections for the meter. Figs. 5 and 6 are respectively a vertical elevation and a plan view showing a modification.

Like parts are represented by similar letters of reference in the several views.

In the said drawings, $a$ represents an outer casing, which may be of cast-iron of a plain cylindrical form. It is provided at the bottom with an inlet-opening $b$ and an outlet-opening $b'$. These inlet and outlet openings may be formed by casting or otherwise directly in the bottom $a'$ of the casing $a$, or they may be supported therein in any suitable manner, but each connects through a suitable pipe or conduit $b^2$ to a nipple or nozzle $b^3$, which opens into the box $a$ in a plane parallel with the axis of said box.

The upper part of the box is provided with a suitable cover $a^2$ and is also preferably provided with a cross tree or bar $a^3$, which may furnish the means of attachment for the cover $a^2$ by bolts or screws $a^4$, which pass through said cover and screw into said cross tree or bar. This cross tree or bar is preferably provided with an opening $a^5$, into which the upper part of the meter or dial chamber is adapted to be fitted.

The meter may be of any ordinary construction, as indicated by dotted lines in Fig. 1. It is, however, provided with inlet and outlet openings $c$ and $c'$, corresponding to the nipples or nozzles $b^3$ in the bottom of the box $a$, and these inlet and outlet openings are provided with slip connections adapted, as the meter is lowered into place in the casing, to form a tight joint with the nipples or nozzles in the respective outlet and inlet openings formed in the base or bottom $a'$. The preferable construction for this purpose is shown in detail in Fig. 4 and consists in providing the nipple $b^3$ with a plain hollow extension $b^4$, which is preferably tapered on the outside and attaching to the inlet and outlet openings of the meter a sleeve $c^2$, having on the inside an annular groove $c^3$, with a packing-ring $c^4$, of rubber or other suitable material, fitted therein, the sleeve $c^2$ being of a size adapted to fit over the extension $b^4$, so that the packing-ring will fit snugly around said extension, and as the meter is pressed down form a perfectly-tight joint about said extension, so that a complete connection is formed between the outlet and inlet sides of the meter and the outlet and inlet sides or openings of the box or casing.

The meter will be preferably provided with an extension at the top from the body of the meter to the dial-plate in a well-known manner, so that the dial is carried to a point at or near the top of the casing. The cross tree or bar $a^3$, in which the dial-plate is supported, is also made removable, so that by removing the cover $a^2$ the reading of the meter can be obtained at any time, and then by removing the cross-bar $a^3$ the meter itself may be elevated out of the box or replaced therein at any time desired for repairs or otherwise, the supply-opening being of course provided with the customary stop-cock for this purpose.

In Figs. 5 and 6 I have shown the constructions slightly modified, the inlets and outlets $b$ and $b'$ being in this case formed in a single casting $b^5$, which is bolted or otherwise secured to the bottom $a'$ of the casing. I have also provided in this case a stop-cock $b'$, secured into the inlet-opening $b$ and located within the box $a$.

It will be seen from the above description that the meter box or casing thus described may be placed at any suitable point along the water mains or branches, in the street or otherwise, and connected up to said mains or branches with a suitable stop-cock either on the inside or outside of the box or casing. Being thus connected a meter may be supplied or removed at any time for repairs or otherwise, while at the same time the meter is readily accessible at any time and without entering upon the premises of the user.

Having thus described my invention, I claim—

1. In a box for water-meters, an outer casing, outlet and inlet pipes or conduits extending from the outside to the inside of said box, said outlet and inlet pipes terminating in parallel nipples whose axes are parallel to the axis of the meter-box, said nipples being adapted to form, with the outlet and inlet openings of a meter, slip connections by which the meter may be attached or detached by a longitudinal movement of said box or casing, substantially as specified.

2. The combination with an outer box or casing, of a meter-support arranged in said box, said meter-support being provided with pipes or conduits adapted to form outlet and inlet openings, said outlet and inlet openings having on the outside of said box or casing connections for the pipes leading to and from said meter and terminating in said box or casing in parallel nipples having plain peripheries and each of which projects into said box or casing in line with the axis of said box or casing and adapted to form with the outlet and inlet openings of a meter slip connections by which said meter may be attached or detached, substantially as specified.

3. The combination with the outer box or casing, of a meter-support therein having L-shaped pipes or conduits to form outlet and inlet openings, one end of each of said pipes or conduits being extended to the outside of said box, the remaining ends terminating in parallel nipples extending above said meter-support with their axes parallel to the axis of the meter-box, in combination with a meter having slip connections to fit the said nipples, substantially as and for the purpose specified.

4. The combination with the outer casing and a meter-support, said meter-support being provided with L-shaped pipes which terminate in said box in projecting nipples parallel to each other and in line with or parallel to the axis of said box or casing, in combination with a meter having sleeves with yielding packing-rings fitted to the outlet and inlet openings thereof, which sleeves and rings are adapted to fit over said nipples, a dial-support removably secured in said casing above said meter-support, and a removable cover for said casing, substantially as and for the purpose specified.

In testimony whereof I have hereunto set my hand this 19th day of June, A. D. 1895.

JOHN J. HOPPES.

Witnesses:
G. M. GRIDLEY,
CHAS. I. WELCH.